United States Patent [19]

Griffin et al.

[11] 4,092,936
[45] June 6, 1978

[54] METHOD AND APPARATUS FOR SEED TAPE PLANTING

[75] Inventors: J. Curtis Griffin; Clyde C. Griffin, both of Branford, Fla.

[73] Assignee: Harrington Manufacturing Co., Lewiston, N.C.

[21] Appl. No.: 699,585

[22] Filed: Jun. 24, 1976

[51] Int. Cl.² ............ A01C 7/00; A01G 13/02
[52] U.S. Cl. ............................. 111/1; 47/9;
 47/56; 61/72.6; 111/3; 111/DIG. 1
[58] Field of Search ............ 111/1, 3, 2; 47/9, 56,
 47/DIG. 1; 61/72.6; 172/539

[56] References Cited

U.S. PATENT DOCUMENTS

| 107,074 | 9/1870 | McConaughy | 172/539 X |
|---|---|---|---|
| 1,787,902 | 1/1931 | Herfort | 47/9 |
| 3,176,635 | 4/1965 | Mabon | 111/3 |
| 3,180,290 | 4/1965 | Kappelmann et al. | 47/9 X |
| 3,293,797 | 12/1966 | Kappelmann et al. | 47/9 |
| 3,315,623 | 4/1967 | Tschudy, Jr. | 111/1 |
| 3,408,823 | 11/1968 | Okita et al. | 61/72.6 |
| 3,468,267 | 9/1969 | Morris et al. | 47/9 X |
| 3,559,599 | 2/1971 | Hoadley | 111/1 |
| 3,791,321 | 2/1974 | Tsutsumi | 47/9 X |
| 3,955,319 | 5/1976 | Smith | 47/56 |
| 3,955,319 | 5/1976 | Smith | 47/56 X |

FOREIGN PATENT DOCUMENTS

| 640,532 | 3/1964 | Belgium | 47/9 |
|---|---|---|---|
| 817,157 | 7/1959 | United Kingdom | 61/72.6 |
| 749,581 | 5/1956 | United Kingdom | 111/2 |
| 1,339,270 | 11/1973 | United Kingdom | 47/9 |

*Primary Examiner*—Edgar S. Burr
*Assistant Examiner*—Steven A. Bratlie
*Attorney, Agent, or Firm*—Mills & Coats

[57] ABSTRACT

A method and apparatus for planting seed tape wherein a seed tape planter is pulled through the field during a planting operation, and planting seed tape is accomplished by forming a seed bed, dispensing seed tape onto or into the formed seed bed, opening furrows or cavities on each side of said formed seed bed, dispensing a covering material over said formed seed bed and the dispensed seed tape, urging the edges of said covering material into the open furrows or cavities, and closing the furrows or cavities by back filling the same with the displaced dirt or soil from the furrows or cavities so as to cover the edges of said covering material such that the back filled dirt or soil acts to hold the covering material about said formed seed bed.

14 Claims, 13 Drawing Figures

METHOD AND APPARATUS FOR SEED TAPE PLANTING

The present invention relates to planting and more particularly to a method and apparatus for planting seed tape directly into a field.

BACKGROUND OF THE INVENTION

Seed tape is commercially available and can be used in direct field seeding by appropriately lying or embedding the seed tape on or in the soil according to prescribed planting practices for the particular seeds being planted. After planting such seed tape, the tape portion thereof is designed to disintegrate and the seeds are left to germinate. Presently seed tape is used by home gardners and generally in small scale planting operations. Greater and large scale use of seed tape could be expected if the planting operation could be mechanized by a proven and relatively simple fully automatic seed tape planter that was completely reliable and which performed the planting operations such that a high seed germination and seedling survival rate could reasonably be expected.

Moreover, seed tape planting is finding application in some crops that were previously field started by transplanting plants directly in the field. For example, in the case of tobacco there is now experimental work with direct field seeding by the use of seed tape. Obviously, direct field seeding eliminates transplanting in such cases, which is expensive and time consuming. Thus, if direct field seeding can be commercially perfected for conventional transplanted crops such as tobacco, tomatoes, and sweet potatoes, etc., then the crop production efficiency of such crops should be increased. However, one of the determining factors that will influence the success and acceptance of direct field seeding in conventional transplanted crops will be whether or not a successful automatic seed tape planter can be produced that is reliable, efficient, has large planting capacity, and which provides for the protection of the seed and initial seedlings in order that a high rate of seed germination and seedling survival is accomplished.

SUMMARY OF THE INVENTION

The present invention relates to a method and apparatus for planting seed tape, in which the apparatus or seed tape planter is fully automatic and is designed for large scale and high capacity planting operations. More particularly, the seed tape planter of the present invention, which can be a single row planter or multi-row planter, includes means for forming a continuous seed bed during the field operation, means for dispensing seed tape onto or into the soil of the formed seed bed, and means for covering the formed seed bed and the seed tape with a covering material that protects the seed and seedling from cold weather and other undesirable environmental conditions. By forming the seed bed and providing the protective covering about the resulting seeds, the seed tape planter of the present invention is designed to plant seed tape in an environment that maximizes seed germination so as to assure a good stand of uniform plants.

It is, therefore, an object of the present invention to provide a method and apparatus for field planting seed tape that properly conditions the soil prior to planting by forming a seed bed in the soil, and which also protects the seeds and resulting seedlings from frost, cold weather, and other detrimental environmental conditions.

A further object of the present invention is to provide an automatic high capacity seed tape planter that is reliable, efficient, and effective in large scale planting operations.

Still a further object of the present invention resides in the provision of an automatic seed tape planter that is particularly adapted to be connected to a tractor and to be pulled through the field during the planting operation, wherein the planter is provided with means for forming a continuous seed bed through the field, means for dispensing seed tape onto or into the soil of the formed seed bed, and means for dispensing a protective covering over the seed bed to protect the seeds and resulting seedlings and wherein the same planter is adapted to urge a continuous layer of soil on each side of the covering material in order to hold the same about the formed seed bed.

Another object of the present invention resides in the provision of a seed tape planter that is adapted to plant seed tape directly on the soil, or to embed the seed tape into the soil an appropriate depth for the particular seed being planted.

Othe objects and advantages of the present invention will become apparent from a study of the following description and the accompanying drawings which are merely illustrative of the present invention.

BRIEF DESCRIPTION OF THE DRAWINGS

FIG. 3 is a side elevational view of the seed tape planter particularly illustrating the relationship thereof to a tractor that it is connected to.

SEED TAPE PLANTER

With further reference to the drawings, the seed tape planter of the present invention is shown therein and indicated generally by the numeral 10. As viewed in the drawings, the seed tape planter 10 is connected to a tractor 12 through a conventional three point hitch assembly associated with the tractor in order that during operation the seed tape planter 10 is pulled through the field by the tractor 12.

Viewing the seed planter 10 in greater detail, the same is provided with a hitching frame assembly that comprises a transverse tool bar 14 that has fixed generally about the mid-point thereof a center hitch attachment 16 that extends generally upwardly and forwardly from the tool bar 14 to where the same connects with the upper center hitching mechanism of the tractor's three point hitch attachment. Extending forwardly on each side of the center hitch attachment 16 are side hitch members 18 and 20. Each of the side hitch members 18 and 20 includes a relatively short outwardly extending connecting shaft 22 that is adapted to receive and connect in conventional fashion to the lower side draft links of the tractor's three point hitch assembly.

Laterally spaced along the longitudinal axis of the transverse tool bar 14 is a series of appropriately spaced vertical tool frame supports 24, each tool frame support 24 being connected and secured to the tool bar 14 by a clamping assembly 26. In the case of a two-row planter, such as the type shown in FIGS. 1 through 3, the tool bar 14 is provided with four tool supports, each pair of the tool frame supports 24 being adapted to be secured to one of two main rectangular planter carrier frames 28 and 30. Therefore, it is appreciated that the tool support bar 14, which in operation is operatively pulled and/or supported by the tractor's three point hitch assembly, supports the main planter carrier frames 28 and 30.

Turning now to a discussion of the individual main planter carrier frames 28 and 30, it should be first pointed out that generally each main planter carrier frame is generally and substantially identical in design, construction, and function. Therefore, for the sake of convenience, the following discussion will deal with the structural and functional components of a single main planter carrier frame with the understanding that the seed tape planter 10 of the present invention may be either comprised of a one row unit, in which case there would only be one main planter carrier frame, or a multi-row unit in which case there would be the same number of main carrier frames in the preferred embodiment as the number of rows accommodated.

With respect to the main planter carrier frame 28 or 30, it is seen that the frame construction is generally rectangular and includes front and rear transverse members 32 and 34 respectively, connected and extending across a pair of laterally spaced longitudinal side members 36 and 38. Thus, the front and rear transverse members 32 and 34 along with the longitudinal side members 36 and 38 comprise each respective main planter carrier frames 28 and 30. The structural members just referred to as forming the main planter carrier frame are secured together by weldment or any other suitable securing means that would assure that the main planter carrier frame structure is sturdy and of sufficient structural strength to carry the load associated therewith in typical field conditions in which the seed tape planter 10 of the present invention would be expected to operate.

As has already been pointed out, each planter carrier frame 28, 30 of the present invention is adapted to plant a single row of seed tape and with this in mind, the discussion will now be directed to the structural components and the function of each main planter carrier frames 28, 30.

Figure 1:
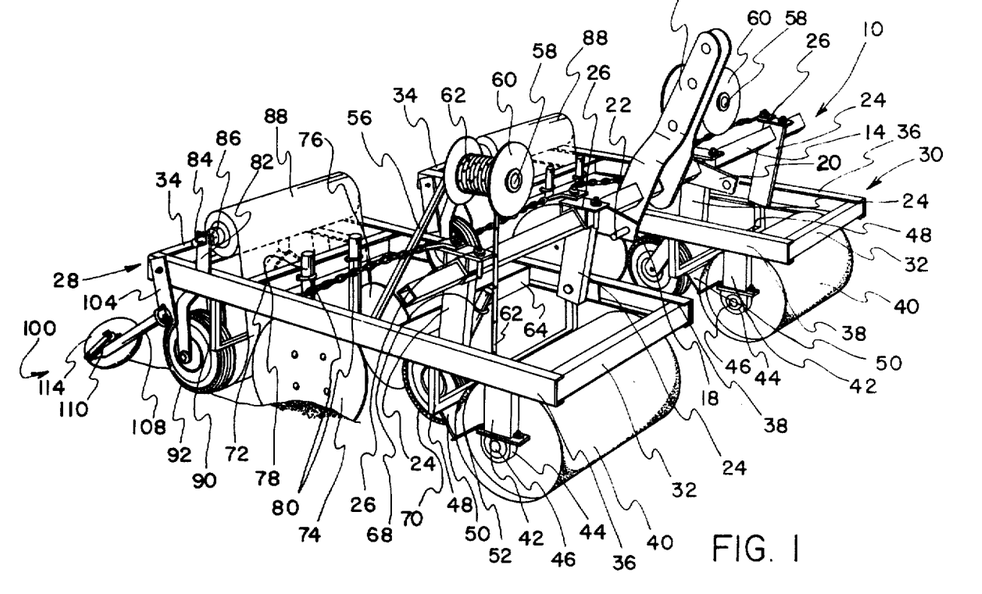
FIG. 1 is a perspective view of the seed tape planter of the present invention as viewed from the front and to one side, the seed tape planter shown herein and forming a preferred embodiment as discussed herein being a two-row planting unit.
Figure 2:
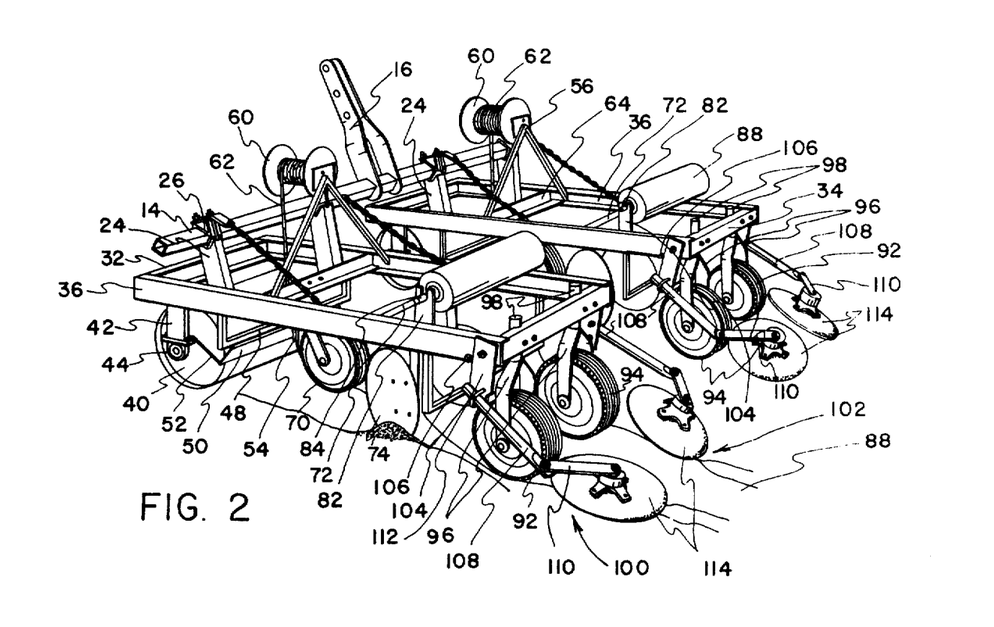
FIG. 2 is a perspective view of the same seed tape planter shown in FIG. 1, as viewed from the rear and to one side.
Figure 3:
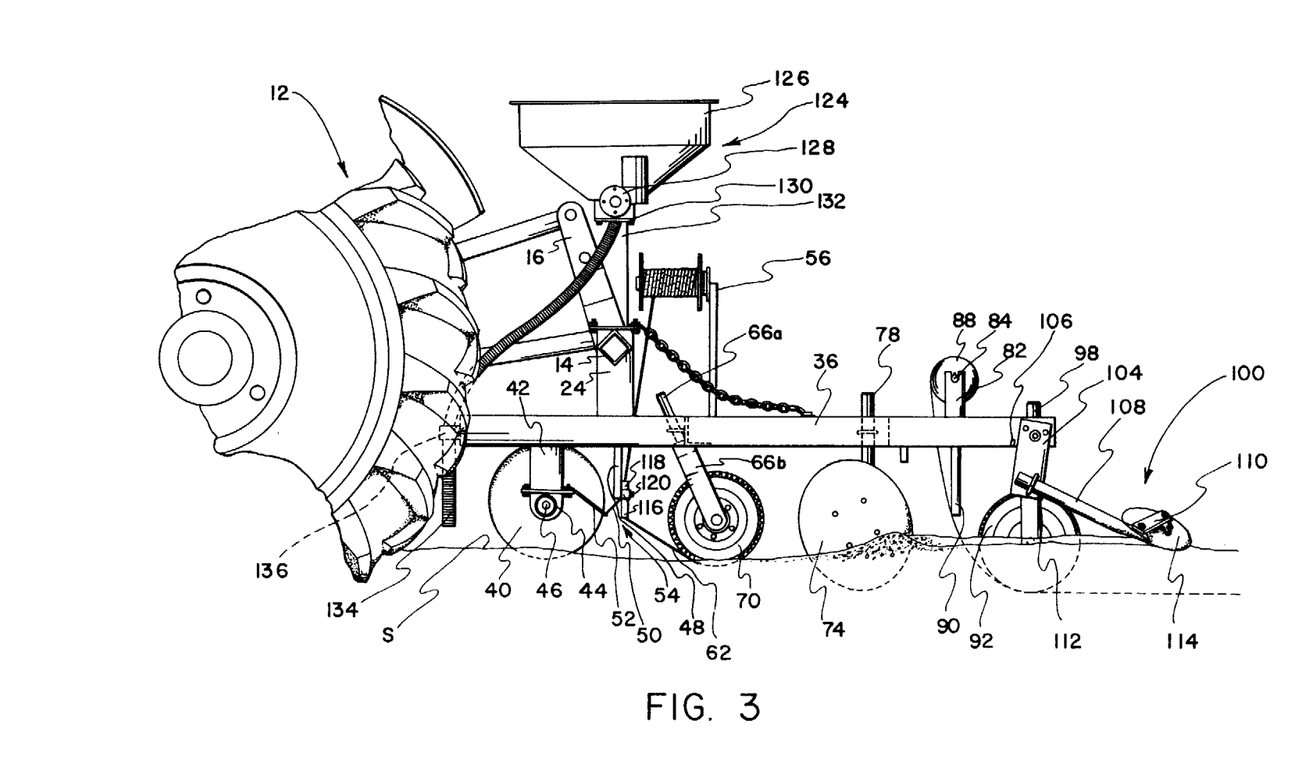

With reference to FIGS. 1 through 3, disposed transversely across the forward end of each main planter carrier frame is a front roller 40 that may be referred to as a firming and fixing bed roller. Roller 40 includes a roller support shaft 46 that is secured within bearing assembly 44 on each side thereof and wherein each bearing assembly 44 on each side of the roller is supported by a roller support member 42 fixed to respective side longitudinal members 36 and 38 of the planter carrier frames and depending downwardly therefrom. Therefore, as the planter 10 is pulled through the field during the seed tape planting operation, the front roller 40 of each carrier frame engages the ground passing thereunder and generally compressing the soil S to form a bed of appropriate firmness in which the seed tape can be planted.

Disposed rearwardly of the roller 40 is a U-shaped support 48 that is again fixed to the side longitudinal members 36 and 38 of the main planter carrier frame. Hinged to the U-shaped support 48 is a roller scraper 50 that is substantially the same width as the roller 40 and includes a transverse terminal edge that is held into continuous engagement with the cylindrical outer surface of the roller 40 by a pair of tension springs 52 that are fixed to the outer edge of the scraper blade 50 and extends therefrom to where the other end thereof is attached to the roller support members 42 or other appropriate structure in the vicinity thereof. The purpose of the scraper blade 50 is to maintain continuous engagement with the outer cylindrical surface of the roller 40 such that the scraper blade cleans dirt and debris from the roller during the planting operation and effectively prevents the build-up of dirt and soil and any other debris about the roller 40.

Disposed over the planter carrier frame generally above the U-shaped support 48 is a tape spool frame 56 that includes a forwardly projecting tape spool shaft 58 that is adapted to receive a tape spool 60 that includes a wound continuous seed tape material 62. Details of the seed tape 62 will not be dealt with herein in detail inasmuch as basic use of seed tape is conventional in agricultural planting of various crops and such seed tape is now commercially available. It should, however, be emphasized that commercial seed tape available is generally of the type that the tape disintegrates once it has been properly laid on or in the soil as a result of time and particularly after sufficient moisture comes in contact with the tape. The disintegration of the tape therefore leaves the seed within or on the soil and proper germination can then take place.

Figure 4:
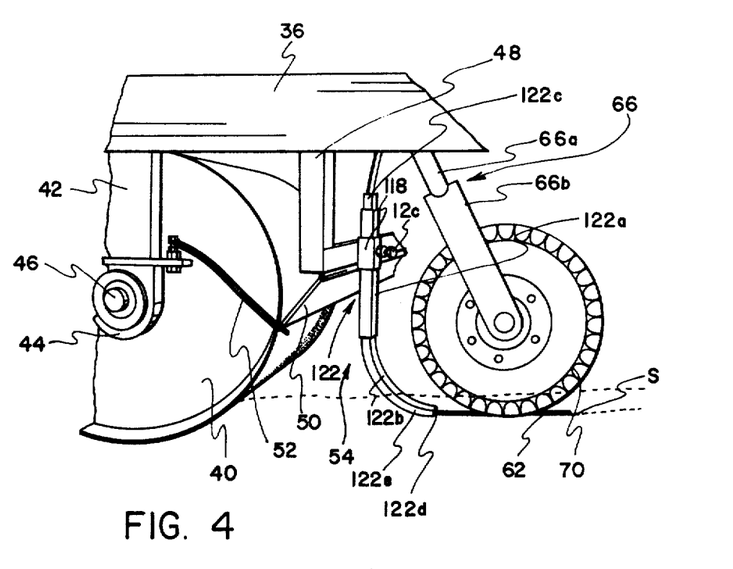
FIG. 4 is a fragmentary perspective view of the seed tape planter of the present invention showing an alternate design for embedding the seed tape within the soil.

During the seed tape planting operation, tape spool 60 rotates about spool shaft 58 and the seed tape 62 is drawn from the tape spool and threaded through tape guide means, indicated generally by the numeral 54 (FIG. 3), that is disposed about the side of U-shaped support member 48. As will be discussed in greater detail in subsequent portions of the present disclosure, tape guide means 54 may be adapted to simply lay the seed tape 62 on top of the soil for a crop such as tobacco or in other cases where the seed should be embedded into the soil an alternate design can be used to place the seed tape at an appropriate depth within the soil (FIG. 4).

Disposed rearwardly of tape guide means 54 is a following wheel 70 that is sometimes referred to as a depression wheel in such cases where the seed tape 62 is to be disposed on top of the soil as opposed to being embedded within the soil. Wheel 70 preferably includes a generally flat smooth outer soil engaging surface and is rotatively supported in a wheel yoke 66b that extends downwardly from a wheel shaft 66a, wheel yoke 66b and shaft 66a forming a wheel frame structure indicated generally by the numeral 66. For appropriately supporting wheel frame 66, there is provided a U-bolt assembly 68 that can be loosened in order that wheel shaft 66a can be adjusted vertically or the angle of the wheel 70 can be adjusted by rotating shaft 66a to a desired position and then tightening the U-bolt assembly 68 to a transverse support member 64 that extends between and is fixed at opposite ends to side longitudinal members 36 and 38 forming a part of the planter carrier frame. Wheel 70 is disposed such that it is in longitudinal alignment with tape guide means 54 in order that the seed tape 62 will pass thereunder.

Continuing to refer to the planter carrier frame indicated by numerals 28 and 30 in the present drawings, disposed rearwardly of wheel 70 within a respective planter carrier frame is a pair of laterally spaced furrow opening discs 74 and 76. Each disc is turned at an oblique angle with respect to the longitudinal axis of the respective planter frame so as to cut out a pair of furrow openings 152 and 154 on each side of the seed bed formed by the roller 40. (FIGS. 7 through 12). Furrow discs 74 and 76 are generally turned such that the soil removed from the furrow openings or cavities 152 and 154 is thrown outwardly to each side of the planter carrier frame side members 36 and 38. The soil displaced from the respective furrow openings or cavities 152 and 154 forms a side ridge or mound of soil 155 that extends outwardly adjacent each furrow openings 152 and 154, it being seen that the side ridge and mound dirt 155 generally extends above the level of the seed bed which is referred to as that area of soil extending between the inner sides of the furrow openings or cavities 152 and 154, as best illustrated in the schematic soil cross sectional drawings shown in FIGS. 7 through 12.

To support the furrow opening discs 74 and 76, there is provided a transverse support 72 that extends laterally across each respective planter carrier frame 28 or 30 and is particularly secured to the members 36 and 38 by weldment or other suitable means. Each disc 74 and 76 is rotatively mounted to an upright shaft support 78. Furrow opening disc shafts 78 extend generally upwardly from the point of connection with the disc to where the upper ends thereof are held and supported by a pair of adjustable U-bolt assemblies 80 that are operatively connected to the transverse support member 72 such that when properly placed about the shafts 78 and tightened, the U-bolt assemblies 80 act to support the furrow opening discs 74 and 76.

After the seed tape 62 has been properly positioned with respect to the soil during the planting operation and the furrow openings or cavities 152 and 154 have been formed, the seed tape planter 10 of the present invention is adapted to cover the seed tape and the seed bed generally with a seed protecting cover material 88. The principal purpose of the seed protecting cover 88 is to protect the seed and particularly to protect the seed against adverse and undesirable environmental conditions such as low or freezing temperature, frost, and the like. Typically the seed protecting cover 88 would be of a porous conventional plant bed cover material such as is commercially available and used on broadcasted or other types of plant beds today. It should be noted that besides a canvas material, it is also contemplated that under certain crop conditions it might be desirable to use a plastic type covering material, or a synthetic covering material, or even a material such as a spun nylon.

Generally, the seed protecting cover 88 would be removed after the seeds have germinated and begun growth and/or after a sufficient time period has past and the farmer is sure that the seeds no longer need protection. Although there may very well be numerous ways to remove the covering material 88, it will be appreciated from studying subsequent portions of the disclosure that in cases where the material must be removed and where the same has been disposed in accordance with the preferred embodiment illustrated herein, that it will be necessary to pull the outer edges of the covering material from underneath a side layer of soil on each side of the plant covering material. However, it should be pointed out that the present invention contemplates the use of time disintegrating covering material that will provide a protective covering for the seed for a period of time after which the same will become ineffective and deteriorate or dissolve leaving the germinated seed and/or plant seedlings exposed. Also, it is contemplated that the covering material 88 could be impregnated with fertilizer, plant growth material of other types, and even herbicides. In such cases, it is expected that the impregnated material (fertilizer and/or herbicides) would be provided in the form of time release material where the impregnated material would be effective over a desired period of time to optimize seed germination and the resulting plant growth.

Now turning to the seed tape planter and the carrier frame structure therefor, it is seen that disposed rearwardly of the furrow opening discs 74 and 76 is a pair of upstanding post supports 82. Each post support is secured by weldment or other suitable means to the side frame members 36 and 38 in transverse alignment and as particularly illustrated in FIGS. 1 through 3, each post support 82 includes a top cutout opening 82a for receiving a transverse shaft 84. At least one post support 82 includes a stationary upright locking pin 82b that is disposed inwardly thereof and supported by the respective support post and is adapted to extend through an opening 84a formed about a respective end portion of the shaft 84 so as to hold the shaft generally stationary during the seed tape planting operation. Rotatively journaled on shaft 84 is a roller assembly 86. Roller assembly 86 is so journaled for rotation about shaft 84 so as to generally provide a braking or dragging action as the same is rotated about shaft 84. In applying the covering material 88 discussed above, the present invention contemplates the covering material 88 to be wound around a spool-like member 87 wherein in operation the spool-like member 87 is disposed generally tightly adjacent the roller assembly 86 in order that as the covering material 88 is pulled from the roll the roller assembly 86 rotates with the spool 87.

Disposed generally below the covering material 88, as viewed in FIG. 3, is a U-shaped guide bar 90 that is fixed to the side members 36 and 38 of respective carrier frames 28 and 30, with the U-shaped guide members depending downwardly therefrom. As particularly illustrated in the same Figure, FIG. 3, the covering material 88 is rolled from the roller along the forward side of the shaft support post 82 and moves generally downwardly forwardly of the U-shaped guide bar 90 where the outside edge portions of the covering material 88 is guided into the respective furrows 152 and 154 by a pair of cover guide wheels 92 and 94 that depend generally downwardly from the carrier frame and particularly spaced so as to run and engage the ground within the furrow openings or cavities 152 and 154 formed by the furrow opening discs 74 and 76.

Viewing the cover guide wheels 92 and 94, it is seen that each includes a wheel frame having a yoke and a support shaft 98 wherein each shaft is supported by an adjustable U-bolt assembly disposed about the rear cross member 34 of the respective planter carrier frame. Although details of these latter U-bolt assemblies are not shown precisely in the drawings, it is to be understood that the height of the cover guide wheels 92 and 94 can be easily adjusted therein in conventional fashion.

Therefore, it is seen that as the seed tape planter 10 is pulled through the field by the tractor 12 and the seed tape 62 laid thereover, the protective covering material 88 is dispensed over the seed bed by the presence of the cover guide wheels 92 pressing the outer edges thereof into the furrow openings 152 and 154. The pressure applied to the edges of the covering material 88 by the cover guide wheels 92 and 94 assures that the covering material 88, the spool 87 thereof, and the roller assembly 86 rotates about shaft 84. It should be pointed out, as already discussed, that the dragging or braking action of the roller assembly 86 against the shaft 84 generally prohibits the spool 87 and the covering material from free-wheeling as a result of an abrupt or sudden stop in the planting operation.

To assure that the covering material laid over the seed tape 62 is sufficiently held about the seed bed to protect the seed tape 62, the seed tape planter 10 is provided with a pair of closing furrow disc assemblies 100 and 102 about each rear side of the respective carrier frame assemblies 28 and 30. The principal purpose of the closing furrow disc assemblies 100 and 102 is to engage the ridge or mound of dirt 155, as particularly shown in FIGS. 10 and 11, displaced from the respective furrow openings 152 and 154 and to cause that soil or dirt or at least a portion thereof to be urged back into the furrow or cavity openings 152 and 154 so as to cover the outer side edges of the covering material 88 and consequently to supply a holding force thereon such that the covering material is securely held above the seed bed and above the seed tape 62.

Figure 12:
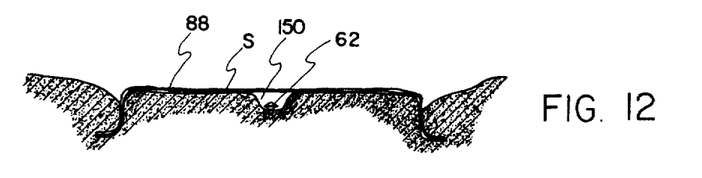

Viewing the closing furrow disc assemblies 100 and 102 in detail, it is seen that each includes a pivot plate 104 pivotably mounted to a respective side member 36 or 38 of each carrier frame assembly about the rear thereof. Each pivot plate 104 includes an adjustable U-bolt and attaching assembly 112 that is adapted to receive and support the forward end of a main support arm 108. Adjustably connected to the rearmost remote end of the main support arm 108 is an adjustable secondary arm 110 that extends generally inwardly from the point of pivotable connection with said main support arm 108. Rotatively mounted to the rearmost and generally inwardly disposed end of the adjustable secondary arm 110 is a closing furrow disc 114 that is slightly angled at an appropriate angle to engage the ridge or mound of soil 153 and to back fill the same into the respective furrows or cavities 152 and 154 during the planting operation. As seen in FIG. 12, the back filling of the ridge or mound of dirt tends to close the respective furrow or cavity openings and because the guide wheels 92 and 94 have pressed, aligned and placed the edges of the covering material 88 within the furrows or cavities just referred to, it is seen that this back filled soil or dirt acts to tie or hold the covering material over the seed bed and seed tape 62.

Figure 5:
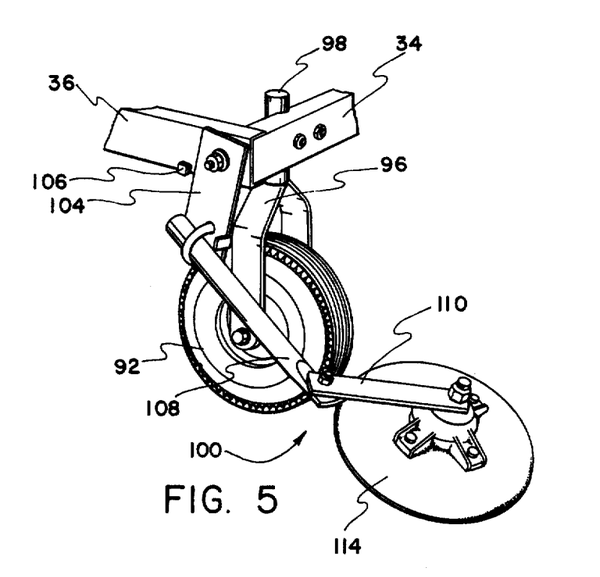
FIG. 5 is a fragmentary perspective view of a rear end portion of the seed tape planter particularly illustrating a respective furrow disc closing assembly that is adapted to urge a continuous layer of soil onto an adjacent edge of the protective covering material dispensed above the formed seed bed.
Figure 6:
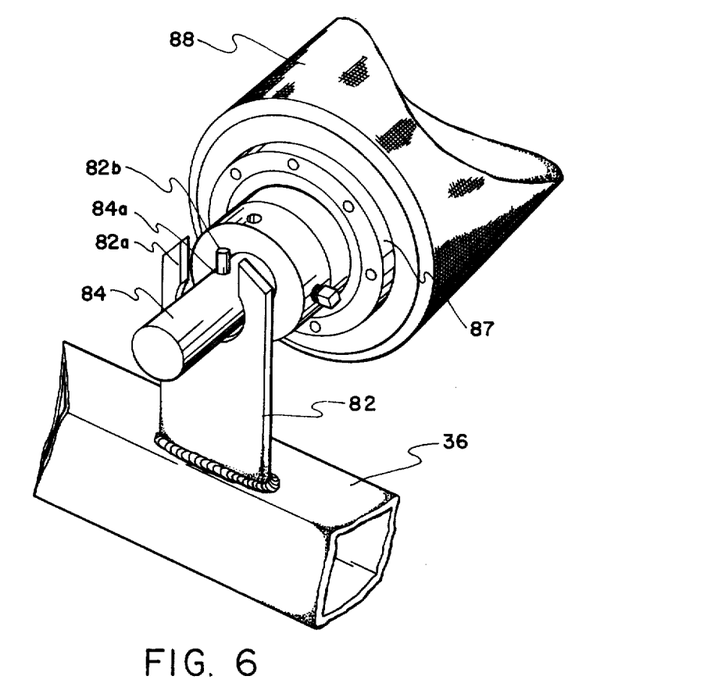
FIG. 6 is a fragmentary perspective view of a portion of the protective covering dispensing roller and the manner of support by the planter frame.

It should be particularly pointed out that the respective closing furrow disc assemblies 100 and 102 are particularly adapted to float along the ridge or the mound of soil 155 during the seed tape planting operation. More particularly, as viewed in FIG. 3, it is desirable to enable the closing furrow disc assemblies 100 and 102 to float and generally move counterclockwise about the pivot axis of the pivot plate 104. This enables the respective closing disc 114 to engage the ridge or mound dirt during the planting operation and to freely move therealong as the planter 10 moves over undulations and terraces or the like in the field during the planting operation. It should be noted, that a stop 106 is particularly disposed on the left side of the pivot plate 104, as viewed in FIGS. 3 and 5, in order to limit the clockwise movement of the respective closing furrow disc assemblies 100 or 102. This is particularly important since in transporting the planter 10 the carrier frames 28 and 30 will be lifted above the level of the ground and it is important that the respective closing furrow disc assemblies 100 and 102 do not rotate clockwise to a point where they would be damaged by lowering the planter back to ground level.

Referring back to the tape guide means 54 disposed about the transverse U-shaped member 48, in the case of above-ground planting such as is the accepted cultural practice for tobacco seeds, the planter 10 of the present invention (as illustrated in FIG. 3) simply guides the seed tape downwardly underneath depression wheels 70 where the seed tapes 62 is laid on top of the soil is in a depression generally the width of the wheel 70. In this case the tape guide means indicated generally by numeral 54 includes a guide sleeve 116 supported as illustrated in FIG. 3 by a holding collar 118 secured or fixed to U-shaped member 48. The guide sleeve 116 is removable from the holding collar 118 and in operation is firmly held therein by adjustable screw 120.

Because seed tape planter 10 of the present invention can be used to plant any type of crop where the seed is disposed within the seed tape 62, it should be pointed out that a substantial number of seeds require that in the planting process the seed be actually placed underground an appropriate distance corresponding with the generally accepted seed cultural practice for that particular crop or seed. Usually in cases such as tomatoes, melons, cucumbers or the like, one can expect to find that the accepted planting depth would range from approximately ¼ inch to 1 inch deep in the soil.

Therefore, to accommodate underground planting or seed embedding, the seed tape guide means 54 can be altered in design to conform to the basic design characteristics of that shown and illustrated in FIG. 4. With respect to this embodiment, guide sleeve 116 referred to above and shown in FIG. 3 is replaced by an alternate seed tape guide sleeve assembly indicated generally by the numeral 122. Viewing alternate guide sleeve 122, it is seen that the same includes an outer holding sleeve 122a that is held within the holding collar 118 by the adjustable screw 12c. Integrally constructed with the outer holding sleeve 122a is an inner tape guide sleeve 122b having an inlet end 122c, and exiting end 122d, and a generally curved or arcuate shaped lower end 122e that is so curved that the exiting end 122d is curved generally rearwardly, as illustrated in FIG. 4. In operation, this alternate seed tape guide sleeve assembly 122 is adjusted with respect to the planter 10 and the front forming roller 40 such that the exiting end 122d is actually pulled through the soil and below the top level of the formed seed bed such that the seed tape 62 is deposited within the ground at an appropriate depth for the seeds being planted. Threfore, it is appreciated that with the alternate seed tape guide sleeve assembly 122 that planter 10 of the present invention is compatible with crops that require that seeds be planted both aboveground and underground.

As an alternate embodiment, the seed tape planter 10 of the present invention may be provided with a fertilizer distributor assembly, indicated generally by the numeral 124, in the form of an attachment to the planter or even integrally constructed therewith. With reference to FIG. 3, planter 10 is shown with a fertilizer distributor 124 supported and carried thereon during the seed tape planting operation. Although various support designs and structural details of the fertilizer distributor 124 can be varied depending on the particular objectives desired, the embodiment illustrated in FIG. 3 depicts the fertilizer distributor as including a hopper 126 for containing and supporting the fertilizer, the hopper being of a conventional gravity feed type and provided with an agitating and/or distributing shaft assembly (not shown) therein which is driven by suitable drive means such as an electric motor and reduction drive gear assembly 128. With such an electric motor, the electrical system of the tractor 12 may be used to power the same. Other drive means may be provided such as a chain drive that would be driven from either the shaft of the roller 40 or a ground engaging drive wheel provided and operatively associated with said planter 10.

As viewed in FIG. 3, the fertilizer distributor 124 is generally disposed midway along the tool bar 14. Hopper 126 is provided with a hopper base plate 130 about the bottom portion of the hopper and secured to said hopper base plate 130 is a hopper support post 132 that is secured or clamped to the tool bar at a particular point. In this case, the point of connection being the space along the tool bar 14 between the area where the center attachment link 116 is secured to the tool bar. Although the hopper support post 132 may be tightly secured to the tool bar by weldment or other suitable securing means, it is contemplated that a clamping assembly provided on the lower end of the post would be sufficient to support the fertilizer distributor 124 in a firm upright position. Communicatively connected to the lower portion of the hopper 126 and extending generally downwardly therefrom is distributing snout means 134 that extends in front of the front cross members 32 forming a part of the planter carrier frame 28 and 30 wherein there is provided snout guide and support means 136 for generally holding the snout in a proper distributing position in front of the respective roller 40 of the planter 10.

Figure 7:
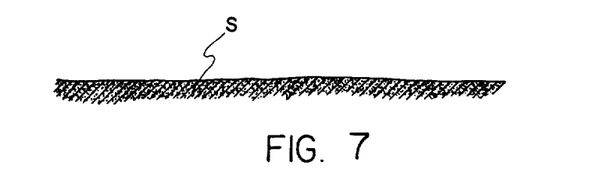
FIGS. 7 through 12 are a sequence of fragmentary soil cross sectional views illustrating the basic steps of the method of seed tape planting, wherein the particular method illustrated relates to laying the seed tape on the soil.
Figure 8:
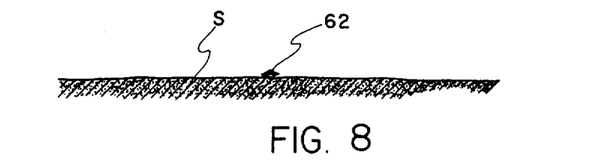
Figure 9:
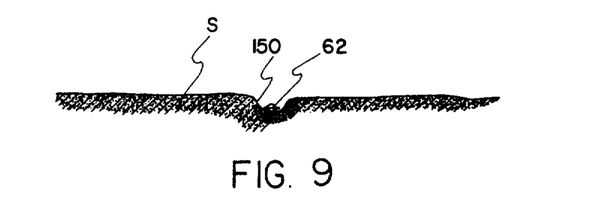
Figure 10:
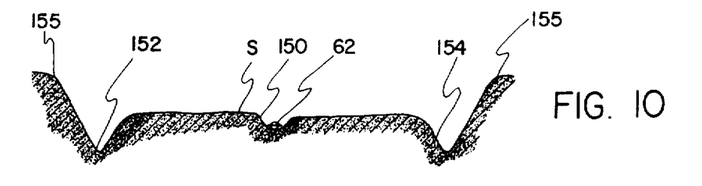
Figure 11:
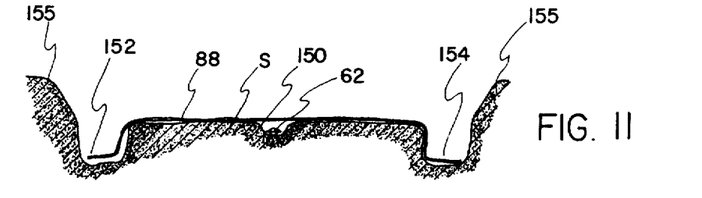

Now with reference to FIGS. 7 through 12 and the basic method of seed tape planting disclosed herein, it is appreciated that as the planter 10 is pulled through the field during the planting operation that the rollers 40 form a seed bed about the soil S passed over, as illustrated in FIG. 7. After the seed bed has been formed, the seed tape 62 is dispensed onto or into the soil S about the formed seed bed. As shown in FIG. 8, the seed tape 62 is laid directly on top of the formed seed bed such as is the accepted practice in planting tobacco seeds. In this case, the depression wheel 70 follows the seed tape in alignment therewith and engages the same causing a depression 150 to be formed in the seed bed, as illustrated in FIG. 9, with the seed tape 62 being generally pressed into the formed depression by the wheel 70. As the planter 10 is pulled through the field, the furrow opening discs 74 and 76 act to open furrows or cavities 152 and 154 on each side of the depression 150, as illustrated in FIG. 10. Next, the covering material 88 is dispensed over the formed seed bed with the outer edges thereof being pressed into the furrows or cavities 152 and 154 by the cover guide wheels 92 and 94. After this, the furrow closing disc assemblies 100 and 102 act to engage the side mound of dirt 155 disposed on each side of the seed bed and to urge at least a portion thereof back into the cavities 152 and 154, thereby covering the side edges of the covering material 88 and tending to hold the covering material about the seed bed, as shown in FIG. 12.

Figure 13:
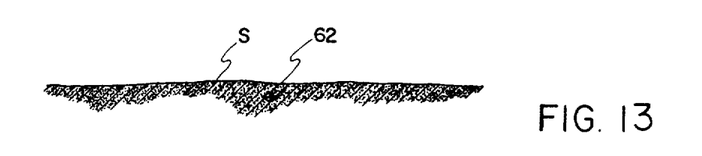
FIG. 13 is a fragmentary cross sectional view of a soil profile illustrating the seed tape being embedded within the soil an appropriate depth as contrasted to laying the seed tape on the soil as shown in FIG. 8.

In the case where it is required to embed the seed tape 62 into the soil, the basic method or steps referred to above and illustrated in FIGS. 7 through 12 apply with the exception of the step in laying the seed tape 62. In this case, as illustrated in FIG. 13, the planter embodiment shown in FIG. 4 is used and the seed tape 62 is embedded an appropriate distance within the formed seed bed as illustrated in FIG. 13. Otherwise, the basic method and steps outlined above apply to a planting operation where the seed tape is embedded in the soil.

The terms "upper", "lower", "forward", "rearward", etc., have been used herein merely for the convenience of the foregoing specification and in the appended claims to describe the method and apparatus for seed tape planting and its parts as oriented in the drawings. It is to be understood, however, that these terms are in no way limiting to the invention since the method and apparatus for seed tape planting may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. An automatic seed tape planter for field planting seed tape, comprising:
    A. a mobile frame structure having connecting means associated therewith for connecting the frame structure thereof to a tractor such that said planter can be pulled through a field by said tractor during the planting operation;
    B. means mounted about the front of said frame structure for forming a seed bed about a top portion of the soil within the field being traversed by said planter, said seed bed forming means including:
        B1. roller means rotatively mounted forwardly within said frame structure about a transverse axis;
        B2. said roller means including an outer cylindrical surface for engaging the underlying soil as said planter is pulled through the field by said tractor such that the engagement of said outer cylindrical surface with the underlying soil results in the formation of said seed bed; and
        B3. cleaning blade means associated with said seed bed forming means and normally maintained in engagement with the outer cylindrical surface of said roller means for continuously cleaning said cylindrical surface during the planting operation;

C. means for dispensing seed tape from said planter to said formed seed bed where said seed tape is appropriately disposed generally on the surface of said seed bed or embedded within the seed bed in accordance with accepted planting practices for the particular type of seeds within said seed tape, said seed tape dispensing means including:
   C1. means for supporting a spool having said seed tape wound therearound;
   C2. guide means disposed generally below said spool having said seed tape wound therearound, said guide means being spaced vertically above said formed seed bed and having said seed tape threaded therethrough such that as the seed tape is dispensed in the planting operation the seed tape moves through said guide means; and
   C3. wherein there is provided wheel means supported by said frame structure rearwardly of said guide means for passing over said seed tape once the same is engaged with the underlying soil and applying a downward force to generally hold the seed tape about the formed seed bed so as to allow the seed tape to freely unwind from the spool thereof as said planter moves through the field during the planting operation; and D. means for laying a covering material over said formed seed bed and the dispensed seed tape for protecting the seeds and resulting seedlings for a time period after planting said seed tape, said means for laying said covering material including:
   D1. means associated with said frame structure for supporting a spool of covering material about a transverse axis rearwardly of said seed tape dispensing means;
   D2. means for engaging said covering material and pressing the same against the underlying soil during the seed tape planting operation so as to generally hold the covering material about said formed seed bed so as to allow the covering material to properly unwind from the spool thereof during the planting operation;
   D3. furrow opening disc means supported by said planter frame structure forwardly of the area where said covering material is laid, for opening a furrow on each side of said formed seed bed;
   D4. said means for engaging said covering material including a pair of laterally spaced wheels supported by said frame structure and particularly spaced to run in the furrows formed by said furrow opening disc means, said wheels operative to engage side portions of said covering material dispensed from said spool and to press the same into said furrows; and
   D5. back filling means carried by said planter frame structure generally rearwardly of said pair of wheels for back filling portions of the soil displaced from said furrows back into said furrows and over the side portions of said covering material such that the back filled soil tends to hold down said covering material about said seed belt, said back filling means comprising a pair of laterally spaced floating disc assemblies carried by said frame structure about the rear thereof, each floating disc assembly engagable with a mound of dirt displaced from a respective furrow and disposed adjacent thereto so as to urge a portion of the displaced soil back into said furrow, each of said floating disc assemblies including:
      1. pivot plate means rotatably mounted about a transverse axis to said frame structure;
      2. arm means secured to said pivot plate means and extending generally rearwardly therefrom; and
      3. disc means secured to a remote end of said arm means opposite the end thereof which is connected to said pivot plate means, said disc means being angled so as to engage and urge soil disposed adjacent a respective furrow back into said furrow and generally over a respective side portion of said covering material disposed within said furrow.

2. The automatic seed tape planter of claim 1 wherein transverse support means is provided transversely across said frame structure between said roller means and said wheel means for supporting said guide means.

3. The automatic seed tape planter of claim 2 wherein said transverse support means also supports said cleaning blade means that extends therefrom towards said roller means where one edge of said cleaning blade means is maintained in engagement with the outer cylindrical surface of said roller means for continuously cleaning the cylindrical surface during the planting operation.

4. The automatic seed tape planter of claim 3 wherein spring biasing means is operatively connected between said cleaning blade means and a point on said frame structure for biasing said cleaning blade means into continuous engagement with the cylindrical surface of said roller means.

5. The automatic seed tape planter of claim 1 wherein said wheel means of said seed tape dispensing means may act to form a continuous depression in said formed seed bed during the planting operation for receiving seed tape being dispensed by said planter.

6. The automatic seed tape planter of claim 1 wherein said means for supporting said spool of covering material includes braking means operatively associated therewith for applying a drag force during the seed tape planting operation to the covering material being unwound from said spool, thereby preventing the same from freewheeling due to an abrupt stop or decrease in ground speed of the planter.

7. The automatic seed tape planter of claim 1 wherein said seed tape planter is provided with a fertilizer distributor mounted thereon for distributing fertilizer during the seed tape planting operation.

8. The automatic seed tape planter of claim 1 wherein said planter frame structure includes at least one rectangular carrier frame that supports said seed bed forming means, said seed tape dispensing means, and said means for laying said covering material.

9. The automatic seed tape planter of claim 8 wherein a multi-row planter is provided by the provision of a plurality of rectangular carrier frames, each carrier frame adapted to independently plant a single row of seed tape.

10. A method of field planting seed tape wherein the planting operation is performed by an automatic seed tape planter that is adapted to traverse the field during the planting operation, said method comprising the steps of:

A. forming a seed bed about a top portion of the soil within the field as said planter traverses the field by:
  A1. engaging soil within the field with a roller;
  A2. rolling said roller over the soil within the field to form a generally firm top layer of soil which constitutes the seed bed; and
  A3. continuously cleaning dirt and debris from said roller as the roller moves over the field so as to maintain a relatively clean and smooth roller surface;
B. dispensing seed tape from said planter to said formed seed bed where said seed tape is appropriately disposed generally on the surface of said seed bed or embedded within the seed bed in accordance with accepted planting practices for the particular type of seeds within said seed tape, said step of dispensing seed tape including:
  B1. unwinding seed tape from a spool mounted on said planter;
  B2. passing said seed tape through a guide vertically spaced above the seed bed; and
  B3. passing said seed tape underneath a wheel carried by said planter and engaged with the surface of said seed bed where the force of the wheel against the underlying soil tends to hold the seed tape about the seed bed and thereby assure continuous unwinding of the seed tape from the spool as the planter traverses the field; and
C. laying a covering material over said seed bed and the dispensed seed tape for protecting the seeds and resulting seedlings for a time period after planting said seed tape, the step of laying a covering material over said formed seed bed including:
  C1. unwinding said covering material from a spool supported about said planter;
  C2. forming an open furrow on each side of said seed bed;
  C3. guiding the covering material downwardly to said seed bed;
  C4. engaging said covering material and generally pressing the same downwardly into said furrows on each side of said seed bed so as to generally hold the covering material about the soil relative to the moving planter in order that the covering material may be unwound from the spool as the planter traverses the field; and
  C5. securing said covering material to said seed bed in order that the same is generally firmly held about the seed bed by engaging a continuous mound of dirt displaced from respective furrows and disposed adjacent thereto by a floating disc assembly and moving said floating disc assembly over each respective mound of dirt so as to urge portions of the displaced dirt back into each furrow over portions of the covering material depressed into said furrows.

11. The method of seed tape planting of claim 10 wherein the method further includes the step of forming a depression in the soil bed for receiving said seed tape therein, whereby as the planter traverses the field the seed tape can be laid directly into said depression by the wheel engaging the seed tape and generally pressing the same downwardly into the seed bed to form the depression as said planter traverses the field.

12. The method of seed tape planting of claim 10 wherein after said seed tape is passed through said guide, the method further includes the step of embedding the seed tape within the formed seed bed an appropriate depth prior to said wheel passing over the area occupied by the planted seed tape.

13. The method of seed tape planting as recited in claim 10 wherein the method further includes the step of applying a braking action to said spool from which the protective covering material is being unwound, so as to generally prevent the same from freewheeling due to sudden stops or changes in the ground speed of the planter.

14. The method of seed tape planting, as recited in claim 10 wherein the method further includes the step of applying fertilizer to the soil during the seed planting operation.

* * * * *